United States Patent
Jay

(10) Patent No.: US 9,586,162 B2
(45) Date of Patent: Mar. 7, 2017

(54) SYSTEM FOR REDUCING PRODUCT LOSSES, PRODUCT DILUTION, CHEMICAL DILUTION AND WATER CONSUMPTION IN A CROSSFLOW MEMBRANE SEPARATION SYSTEM

(71) Applicant: Dairy Process Systems, Inc., Visalia, CA (US)

(72) Inventor: Jeffrey Jay, Visalia, CA (US)

( * ) Notice: Subject to any disclaimer, the term of this patent is extended or adjusted under 35 U.S.C. 154(b) by 0 days.

(21) Appl. No.: 14/693,504

(22) Filed: Apr. 22, 2015

(65) Prior Publication Data

US 2015/0298035 A1 Oct. 22, 2015

Related U.S. Application Data

(60) Provisional application No. 61/982,548, filed on Apr. 22, 2014.

(51) Int. Cl.
| | |
|---|---|
| *B01D 63/10* | (2006.01) |
| *B01D 63/12* | (2006.01) |
| *B01D 65/02* | (2006.01) |
| *B01D 29/48* | (2006.01) |
| *B01D 35/147* | (2006.01) |
| *B01D 61/20* | (2006.01) |

(52) U.S. Cl.
CPC ......... *B01D 35/1475* (2013.01); *B01D 29/48* (2013.01); *B01D 61/20* (2013.01); *B01D 63/10* (2013.01); *B01D 63/12* (2013.01); *B01D 65/02* (2013.01); *B01D 2311/08* (2013.01); *B01D 2311/25* (2013.01); *B01D 2313/26* (2013.01); *B01D 2315/10* (2013.01); *B01D 2321/185* (2013.01)

(58) Field of Classification Search
CPC .................................................. B01D 35/1475
See application file for complete search history.

(56) References Cited

U.S. PATENT DOCUMENTS

| | | | | |
|---|---|---|---|---|
| 6,004,464 | A * | 12/1999 | Lien .............................. | 210/639 |
| 2003/0038075 | A1 | 2/2003 | Akimoto et al. | |
| 2008/0203017 | A1* | 8/2008 | Zha ......................... | B01D 61/22 |
| | | | | 210/636 |

(Continued)

FOREIGN PATENT DOCUMENTS

| | | |
|---|---|---|
| DE | 202006000174 U1 | 4/2006 |
| WO | 8801895 A1 | 3/1988 |

(Continued)

OTHER PUBLICATIONS

International Search Report and Written Opinion for Application No. PCT/US2015/027095 dated Jul. 31, 2015.

*Primary Examiner* — Krishnan S Menon
*Assistant Examiner* — Bradley R Spies
(74) *Attorney, Agent, or Firm* — Christopher M. Scherer; DeWitt Ross & Stevens S.C.

(57) ABSTRACT

The system and method of the present application improves the efficiency of systems utilizing spiral membranes but can also be applied to systems using other types of membranes. The membrane vessels and membranes are configured in a vertical orientation and a clear path is provided for the removal of product and cleaning chemicals on the retentate and permeate sides of the membrane with hide or no dilution.

20 Claims, 6 Drawing Sheets

(56) References Cited

U.S. PATENT DOCUMENTS

| | | | |
|---|---|---|---|
| 2009/0255873 A1* | 10/2009 | Biltoft | B01D 65/02 210/636 |
| 2010/0038292 A1* | 2/2010 | Fike | 210/87 |
| 2010/0282676 A1* | 11/2010 | Liberman et al. | 210/636 |
| 2011/0139715 A1* | 6/2011 | Zha et al. | 210/636 |

FOREIGN PATENT DOCUMENTS

| | | |
|---|---|---|
| WO | 0078436 A1 | 12/2000 |
| WO | 03031342 A1 | 4/2003 |
| WO | 2006069405 A1 | 6/2006 |

\* cited by examiner

SYSTEM FOR REDUCING PRODUCT LOSSES, PRODUCT DILUTION, CHEMICAL DILUTION AND WATER CONSUMPTION IN A CROSSFLOW MEMBRANE SEPARATION SYSTEM

CROSS-REFERENCE TO RELATED APPLICATIONS

This application claims priority to U.S. Provisional Application No. 61/982,548, filed Apr. 22, 2014, the content of which is incorporated herein by reference in its entirety.

FIELD

The present disclosure generally relates to the field of crossflow membrane separation systems. More specifically, the present disclosure relates to crossflow membrane separation systems used in protein extraction and separation in liquid food product.

BACKGROUND

Some hollow fiber sintered metal, and ceramic crossflow membrane systems have included vertically oriented membrane components. However, many commercial membrane filtration plants, and especially those using spiral membranes, have installed the membranes in vessels that are oriented horizontally, or near horizontally.

While this allows for efficient processing during normal running, it is very inefficient during initial introduction of unprocessed product and removal of product on the retentate side of the membrane at the end of the production run. This can lead to excessive water use and is chemical intensive when the system is cleaned.

Prior to production the horizontally oriented membrane system is normally flooded with water or a suitable chemical solution because it is important to prevent the membranes from drying out. This has to be displaced by introduction of product into the retentate side of the membranes, leading to significant intermixing of the water or chemical solution and the product and resulting in dilution and possible chemical contamination of the product. The initial flow of diluted or contaminated product normally has to be diverted into the plant effluent stream and represents a financial loss to the production facility.

At the end of production the material on the retentate side of the membranes has to be displaced by water due to inefficient drainage from the horizontally oriented membranes. Diluted product at the end of production normally has to be diverted into the plant effluent stream and represents a financial loss to the production facility.

Extremely large volumes of water are needed to remove both product and chemicals, from the membrane system resulting in high potable water consumption and an excessive volume of wastewater. The problem is especially apparent when the retentate is of significantly high viscosity.

SUMMARY

The system and method of the present application improves the efficiency of systems utilizing spiral membranes but can also be applied to systems using other types of membranes. The membrane vessels and membranes are configured in a vertical orientation and a clear path is provided for the removal of product and cleaning chemicals on the retentate and permeate sides of the membrane with little or no dilution.

Material trapped within the membrane structure is discharged by means of the ingress of a controlled flow of air or gas that is asserted at the top of the membrane vessel in order to scavenge materials retained within the membrane structure and discharge them from the bottom of the vertical vessel.

Air or gas ingress is controlled in such a way as to equalize pressure between the retentate and permeate zones of the membrane in order to eliminate stress on the membranes and prevent reverse flow which could de-laminate or otherwise damage them.

This cannot be done with horizontal oriented membranes as normal draining under gravity will provide a free airflow passage at the uppermost section of the membrane with no effect on product in the lower section.

The system and method of the present application may be configured with a single membrane vessel or a plurality of vessels each containing one or more membrane modules that are generally referred to as elements.

The preferred embodiments illustrate a top to bottom vertical flow path through the system, It can be arranged for reverse bottom to top flow with modifications to the membrane vessels and their associated pipelines.

In one embodiment of the present application, a crossflow membrane separation system comprises a membrane vessel housing a membrane element, wherein the membrane vessel has a vertical orientation, a vessel retentate inlet that provides a retentate from a vessel feed line into a retentate side of the vertically oriented membrane vessel, wherein the vessel feed line receives the retentate from a pump, a back pressure control valve adjusted to remove permeate from the retentate to a permeate side of the vertically oriented vessel through the membrane element, a vessel retentate outlet and a vessel permeate outlet, each removing the retentate and the permeate from the vessel, respectively, and a permeate side air inlet that receives air from a permeate air control valve, wherein the air scavenges remaining retentate, permeate or chemical residues from the membrane element.

In an additional embodiment of the present application, a membrane separation system for the separation of dissolved organic and inorganic compounds and particulates comprises a plurality of membrane vessels, each housing a membrane element, wherein the plurality of membrane vessels have a vertical orientation, further wherein each of the plurality of vessels are a vessel stage, plurality of vessel stages, wherein a vessel feed line of each of the plurality of vessel stages is connected to a common feed tank, a vessel retentate inlet that provides a retentate from the vessel feed line into a retentate side of each of the plurality of the vertically oriented membrane vessels, wherein the vessel feed line receives the retentate from a pump coupled with the common feed tank, wherein the vessel retentate inlet of each of the plurality of vessels is connected to a common vessel feed line, a back pressure control valve adjusted to remove permeate from the retentate to a permeate side of the vertically oriented vessel through the membrane, and a vessel retentate outlet and a vessel permeate outlet, each removing the retentate and the permeate from the vessel, respectively.

In an additional embodiment of the present application, a crossflow membrane separation system comprises a membrane vessel housing a membrane element, wherein the membrane vessel has a vertical orientation, a vessel retentate inlet that provides a retentate from a vessel feed line into a retentate side of the vertically oriented membrane vessel, wherein the vessel feed line receives the retentate from a pump, a back pressure control valve adjusted to remove permeate from the retentate to a permeate side of the vertically oriented vessel through the membrane element, and a vessel retentate outlet and a vessel permeate outlet, each removing the retentate and the permeate from the vessel, respectively.

Common Definitions

This disclosure utilizes a number of technical terms known in the art. A number of these terms are defined below:

Retentate: Material that does not pass through a semi-permeable membrane.

Permeate: Material that does pass through a semi-permeable membrane.

Crossflow Membrane filtration: Occurs when material that is to be subjected to a filtration regime is passed under pressure across the retentate side surface of a selectively semi-permeable membrane at a speed sufficient to reduce buildup of fouling material in the pores of the membrane. The positive pressure differential between the retentate side of the membrane and the permeate side causes some components of the material being fed into the retentate side to pass through the membrane and flow into the permeate side. The composition of the components that pass through is determined by the pore size of the semi-permeable membrane.

Reverse Osmosis (RO): Typically used for water purification and concentration of the components of aqueous solutions and colloidal suspensions by means of high pressure crossflow membrane filtration. The pores are small enough to pass molecules of water and prevent both soluble and insoluble components from passing through.

Nano Filtration (NF): Used for concentration of aqueous solutions and colloidal suspensions by medium or high pressure crossflow membrane filtration where loss into the permeate of some smaller molecules is admissible.

Ultra Filtration (UF): Used to selectively fractionate the components of aqueous solutions and colloidal suspensions by medium or low pressure crossflow membrane filtration where loss into the permeate of some smaller molecules is required.

Micro Filtration (MF): Used to selectively fractionate the components of aqueous solutions, colloidal suspensions and solutions containing bacteria, bacterial spores, fat globules and other suspended solid materials by medium or low pressure crossflow membrane filtration where transfer into the permeate of some selected smaller molecules is required.

Tubular Membrane: A selectively permeable membrane is deposited on the inside of a permeable substrate that is in the form of a tube. These are usually arrayed in bundles contained in a separate housing.

Hollow Fiber Membrane: Similar to a tubular membrane but much smaller diameter tubes generally in larger bundles.

Flat Sheet Membrane: A selectively permeable membrane is deposited on a permeable substrate that is in the form of a flat sheet that is restrained by an external device or housing.

Spiral Membrane: The common form found in the water purification and food processing industries takes the form of a selectively permeable membrane deposited on a permeable substrate that is in the form of a flat sheet that is then wound into a spiral with specialized separating material between the winds. It provides the greatest membrane area in the smallest space when compared with the other formats.

Stage: This is a discrete section of a crossflow membrane filtration system comprising one or more membrane vessels together with their local control valves, pumps and pipework.

DETAILED DESCRIPTION OF THE DRAWINGS

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
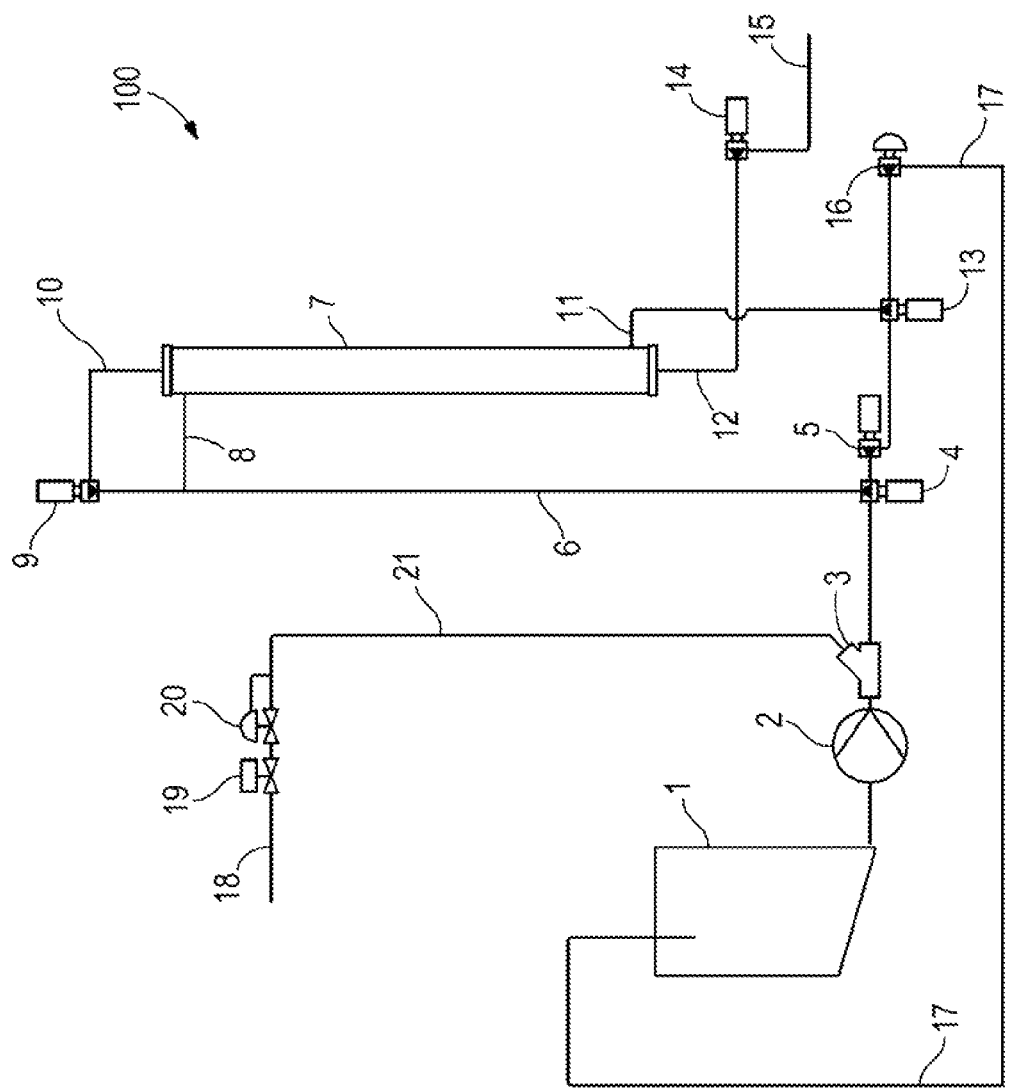
FIG. 1 illustrates an embodiment of a system with a single vertical membrane vessel with its associated components.
Figure 2:
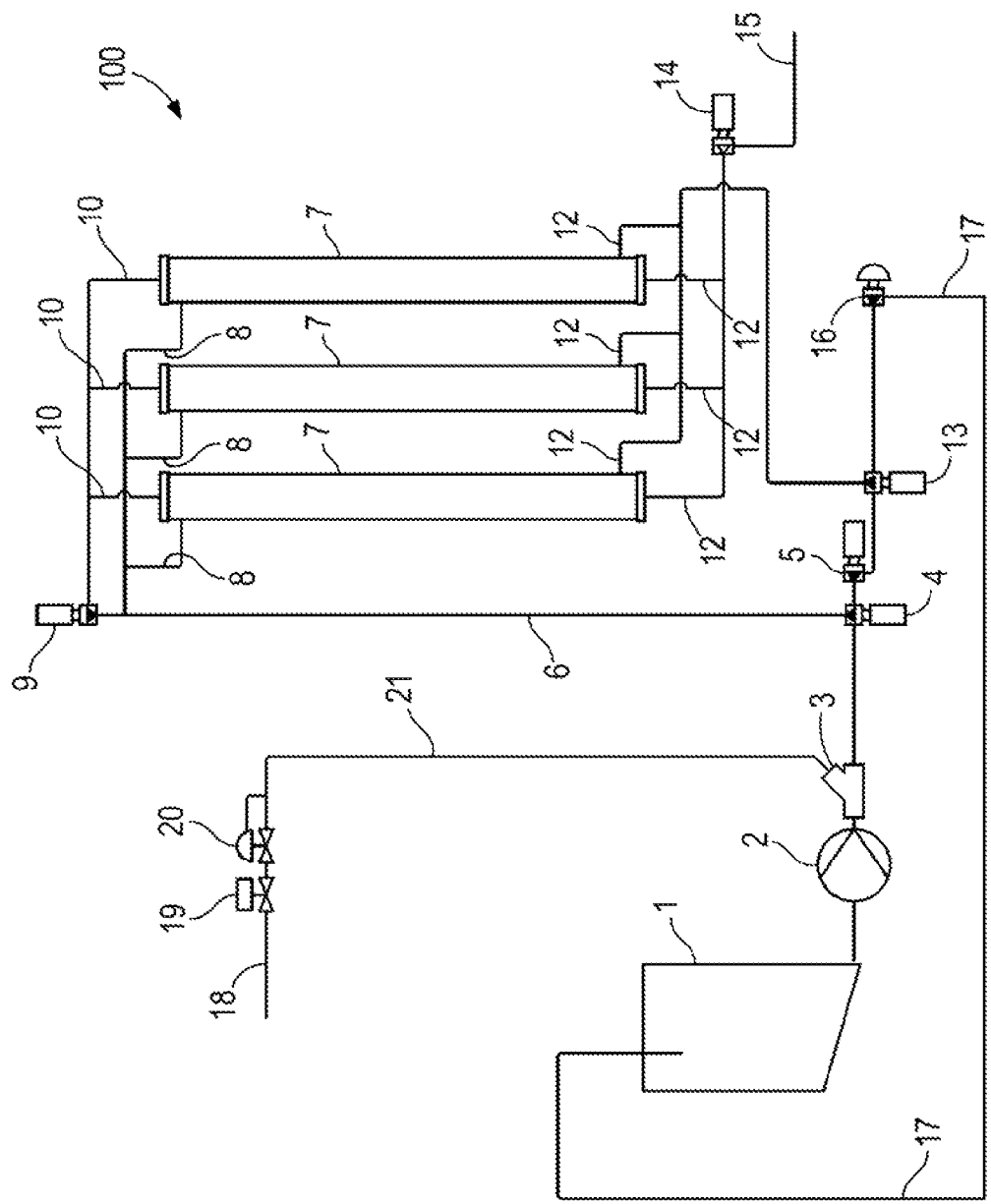
FIG. 2 illustrates an additional embodiment similar to that of FIG. 1 with a plurality of membrane vessels arranged in parallel flow.

A first embodiment of a recirculation system is illustrated in FIG. 1 and FIG. 2. The system (100) is arranged in a recirculation mode with the retentate being returned to the feed tank (1) permitting progressive concentration of the retentate.

The system includes a product feed section including a feed tank (1), a pump (2), a unidirectional air-blow valve (3), an air/gas inlet (18), an air/gas shutoff valve (19), a pressure control valve (20) and a pressure controlled air/gas supply line (21).

The system (100) also includes a membrane vessel arrangement including a raw product and retentate infeed valve (4), a line block valve (5), a vessel feed line (6), a membrane vessel (7) or vessels each containing one or more membrane elements (not shown), a vessel retentate inlet (8), a permeate air control valve (9), a permeate side air inlet to vessel (10), a membrane vessel retentate outlet (11), a vessel permeate outlet (12), a retentate outlet valve (13), a permeate outlet valve (14), a permeate discharge line (15), a retentate back pressure control valve (16) and a recirculation line (17).

Figure 3:
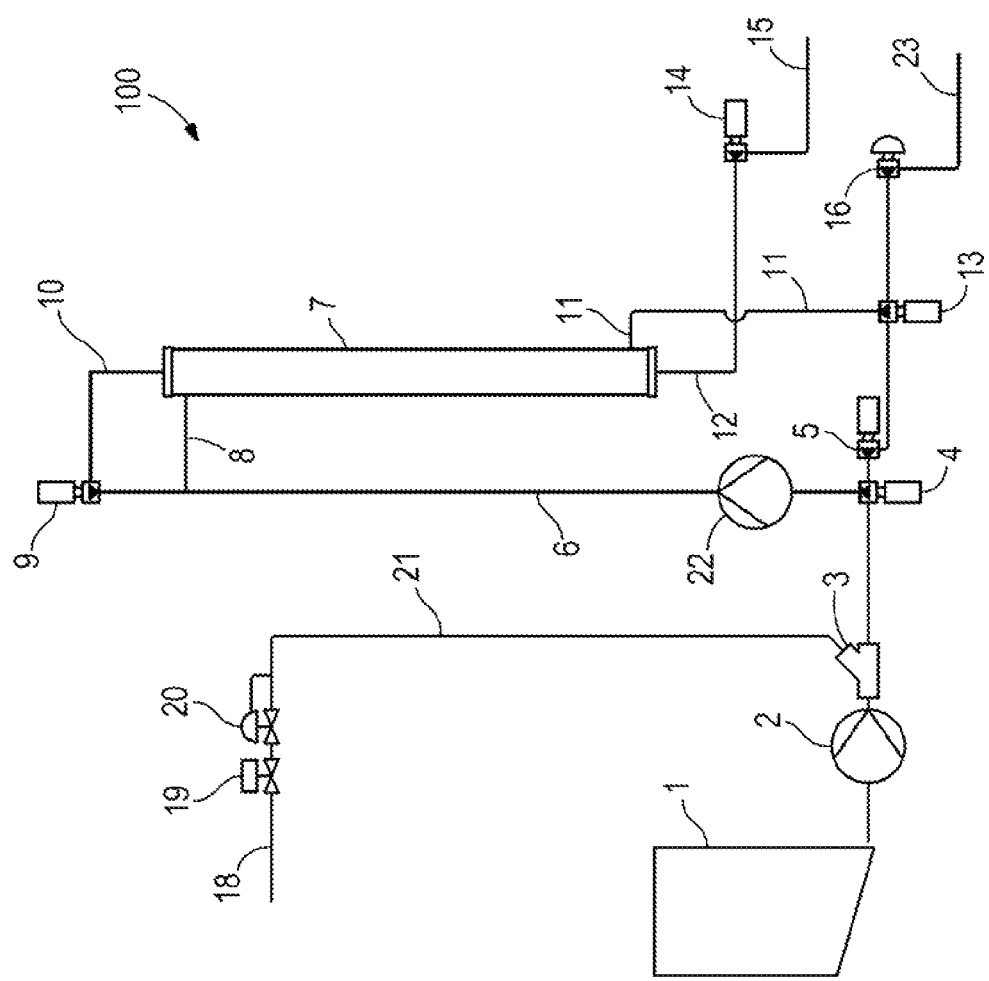
FIG. 3 illustrates an additional embodiment of a system with a single vertical membrane vessel with its associated components.
Figure 4:
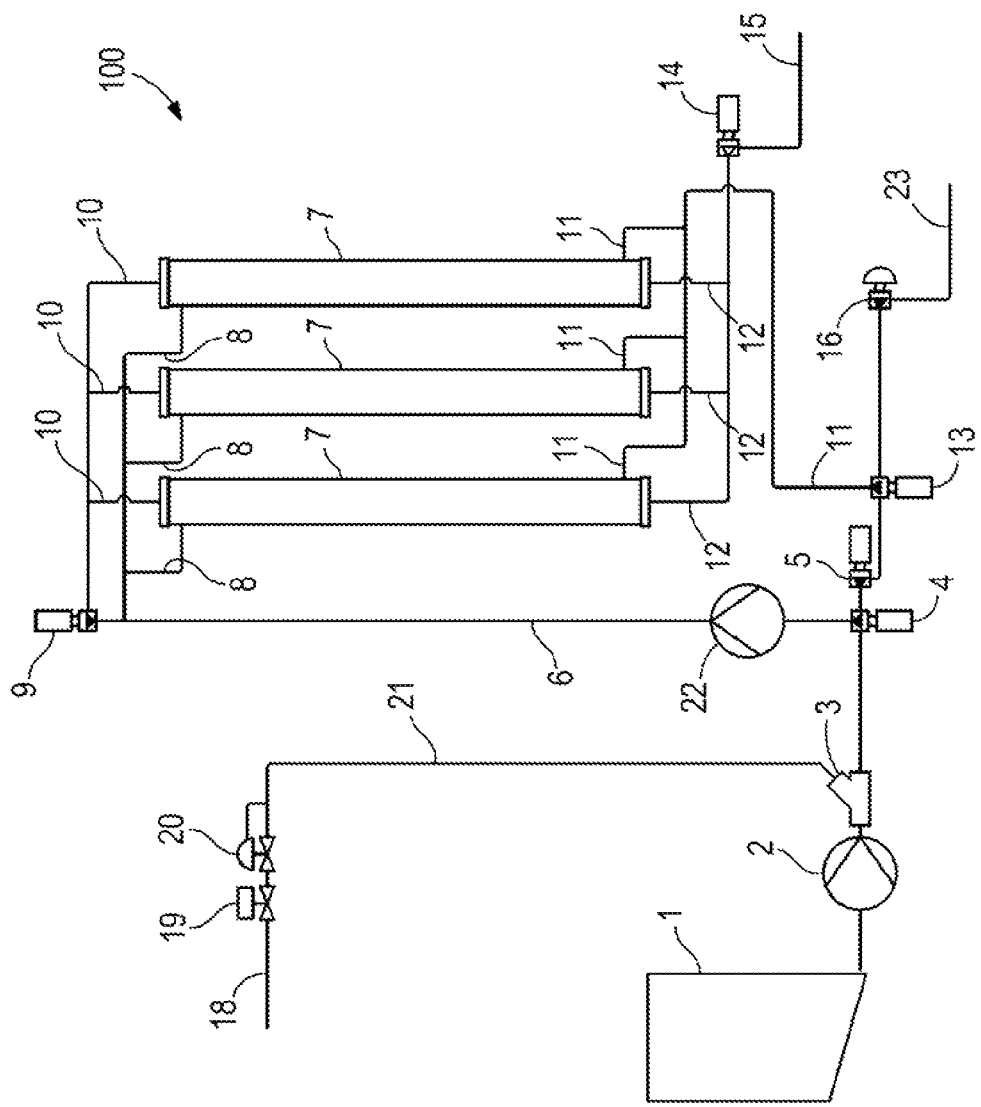
FIG. 4 illustrates an additional embodiment similar to that of FIG. 3 with a plurality of membrane vessels arranged in parallel flow.

An additional single stage system (100) with a rapid circulation loop is illustrated in FIG. 3 and FIG. 4. The system (100) is arranged as a single stage with a rapid recirculation loop driven by a secondary stage recirculation pump (22). This can be configured as a single stage continuous concentration system with retentate being discharged to an external process or storage or as a recirculation concentration system (100) similar to the system shown in FIG. 1.

The system (100) of this embodiment includes product feed section including a tank (1), a pump (2), a unidirectional air-blow valve (3), an air/gas inlet (18), an air/gas shutoff valve (19), a pressure control valve (20) and a pressure controlled air/gas supply line (21).

Still referring to FIG. 3 and FIG. 4, a membrane vessel arrangement includes a raw product and retentate infeed valve (4), a line block valve (5), a stage circulation pump (22), a vessel feed line (6), a membrane vessel (7) or vessels each containing one or more membrane elements, a vessel retentate inlet (8), a permeate air control valve (9), a permeate side air inlet to vessel (10), a membrane vessel retentate outlet (11), a vessel permeate outlet (12), a retentate outlet valve (13), a permeate outlet valve (14), a permeate discharge line (15), a retentate back pressure control valve (16) and a retentate discharge line (23).

Figure 5:
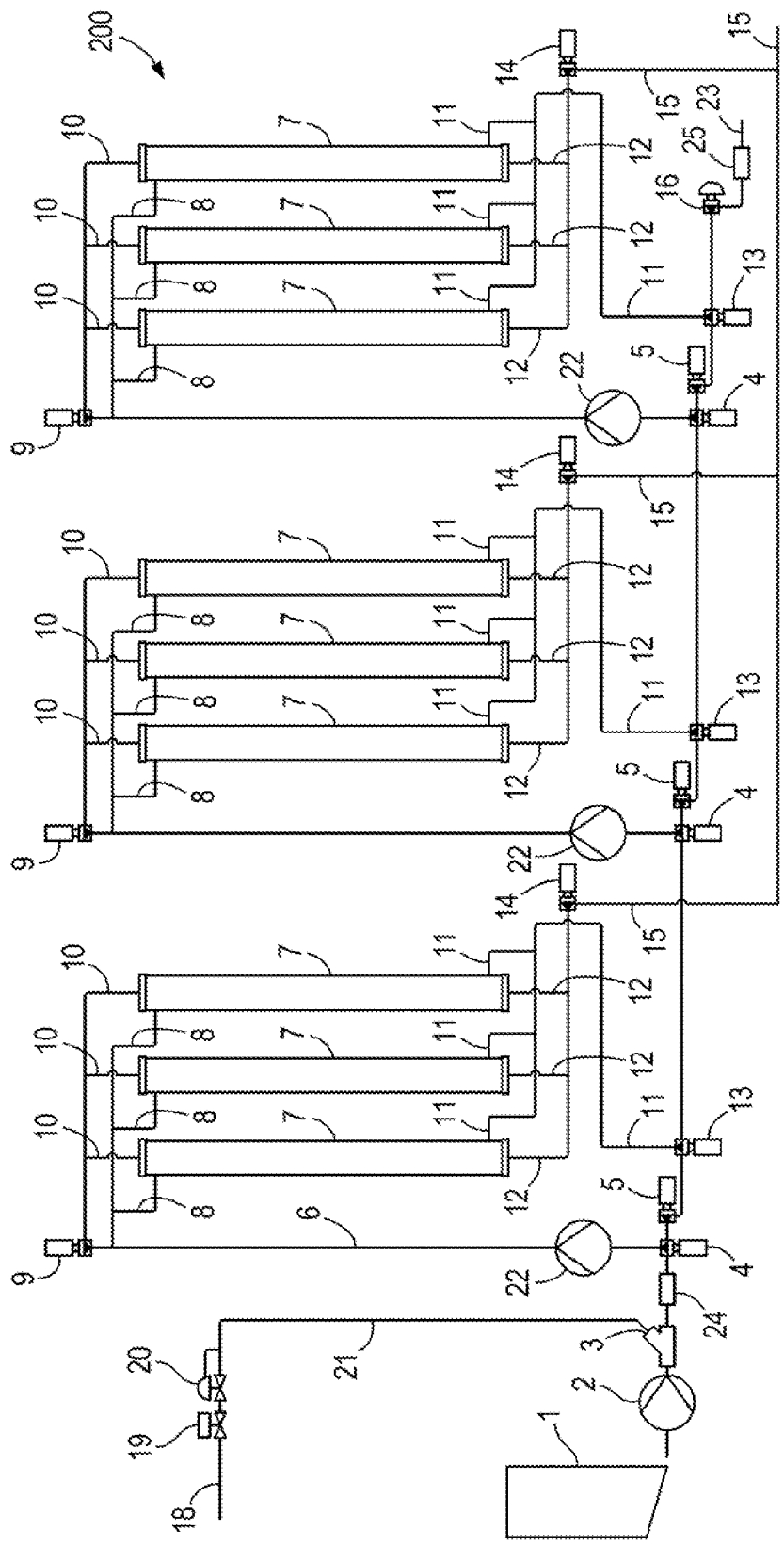
FIG. 5 illustrates an embodiment of a system of the present application including a plurality of stages linked to a common supply pump and feed line.

An embodiment including a multi-stage system (200) with a rapid circulation loop is illustrated in FIG. 5. This system (200) may be configured as a recirculation concentration system or more commonly as a multi-stage continuous concentration system with retentate being discharged to an external process or storage. In this embodiment, the system (200) includes a product feed section comprising a tank (1), a pump (2), a unidirectional air-blow valve (3), a product infeed flow meter (23), an air/gas inlet (18), an air/gas shutoff valve (19), a pressure control valve (20) and a pressure controlled air/gas supply line (21). The system (200) also includes a membrane vessel arrangement with a plurality of stages each comprising raw product and retentate infeed valve (4), a line block valve (5), a stage circulation pump (22), a vessel feed line (6), a membrane vessel (7) or vessels each containing one or more membrane elements, a vessel retentate inlet (8), a permeate air control valve (9), a permeate side air inlet to vessel (10), a membrane vessel retentate outlet (11), a vessel permeate outlet (12), a retentate outlet valve (13), and a permeate outlet valve (14).

Still referring to the system (200) of FIG. 5, there are common elements to each of the stages including a permeate discharge line (15), a retentate back pressure control valve (16), a retentate discharge flow meter (25) and a retentate discharge line (23). Furthermore, all of the above embodiments can utilize reverse bottom to top vertical flow through the membrane vessels with top to bottom product discharge at the end of production.

Figure 6A:
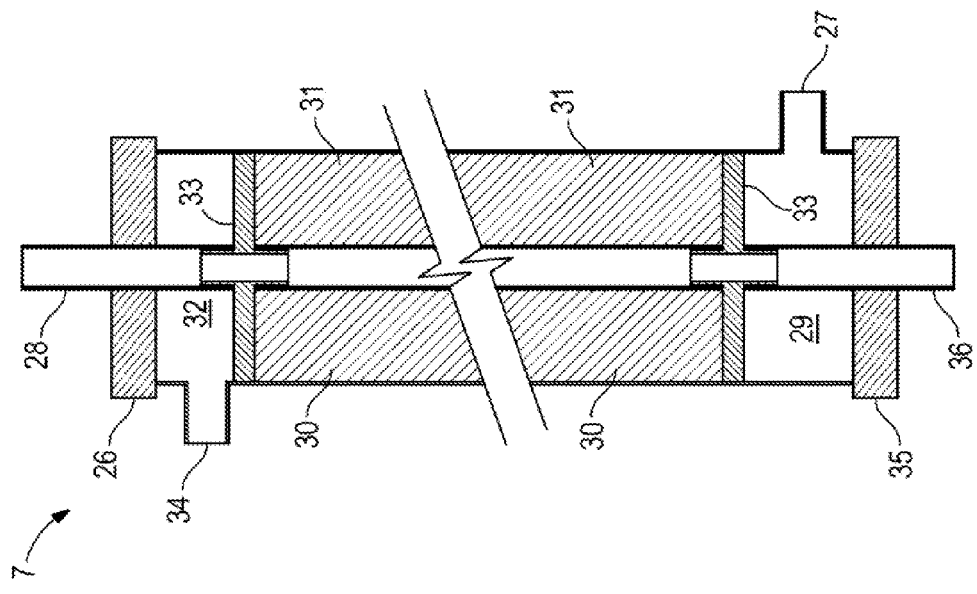
FIG. 6*a* is a partial section through a vertical membrane vessel that is configured for downward vertical flow from the inlet at the top of the vessel with discharge at the bottom.
Figure 6B:
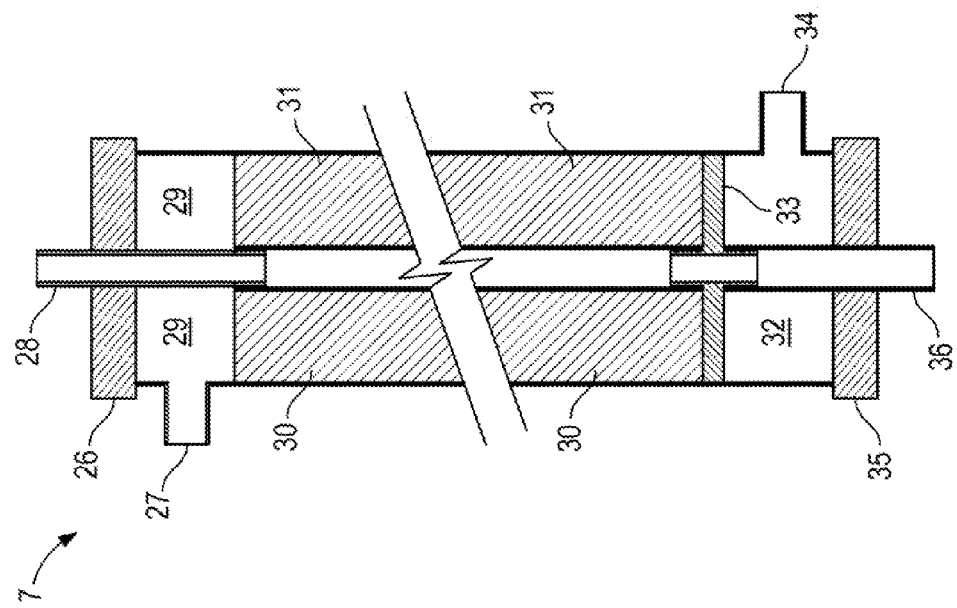
FIG. 6*b* is a partial section through a vertical membrane vessel that is configured for upward vertical flow from the inlet at the bottom of the vessel with discharge at the top.

Two embodiments of configurations for the two flow paths through the membrane vessel (7) are shown in FIGS. 6a and 6b.

In FIG. 6a, for downward flow, the vessel (7) consists of an upper vessel cap (26), a retentate infeed port (27), an air inlet (28), a retentate infeed chamber (29), a vessel wall (30), a membrane element (31), a discharge chamber (32), an anti-telescope device (33), a retentate outlet/discharge port (34), a lower vessel cap (35) and a permeate discharge (36). As discussed previously, the membrane element (31) may be a spiral element or another element known in the art.

In FIG. 6b an additional anti-telescope device (33) is positioned on top of the membrane element (31) in order to facilitate upward flow. Such anti-telescope devices (33) prevent the membrane elements (31) from distortion due to differential pressure between the infeed and discharge end of the spiral winding.

The number of vessels (7), membrane elements (31) and stages in each embodiment is determined by the required duty. Furthermore, all of the above-described embodiments may include in-circuit heat exchangers (not shown) in one or more stages to facilitate temperature adjustment during operation, and may also include additional tanks for permeate and retentate collection and for cleaning solution preparation and supply.

Referring to all of the embodiments described in the figures, any pumps utilized may be of centrifugal or positive displacement types, and valves may be manually operated or remotely controlled, as those known in the art.

In operation, there is an initial draining of the system (100, 200) where prior to production water and chemical solutions are removed from the system (100, 200) by opening the raw product and infeed valve (4), closing the line block valve (5), opening the permeate air control valve (9), opening the membrane vessel retentate outlet valve (13), opening the permeate outlet valve (14), and fully opening the retentate back pressure valve (16).

The air/gas shutoff valve (19) is then opened and air or other gas passes through the air blow valve (3) forcing the water or chemical solutions up the vessel feed line (6), through the retentate inlet (8) and down through the membrane vessel to the retentate outlet (11), and the permeate outlet (15) to be discharged from the system (100, 200).

After a predetermined interval, the permeate outlet valve (14) is closed to increase the scavenging effect through the retentate side of the membrane while maintaining equal pressure on both sides of the membrane (31). In other embodiments, the pressure may only be applied at the retentate side. When the liquid flow from the system (100, 200) is insignificant, the air/gas shutoff valve (19) is closed, the permeate outlet valve (14) is opened and the permeate air control valve (9) is closed.

During the production phase of operation, product to be processed (not shown) by the system is filled into the feed tank (1), and the pump (2) is activated causing product to flow through the infeed valve (4) and the vessel feed line (6) to the retentate inlet (8) of the membrane vessel (7) or vessels and vertically down through the membrane vessel (7) or vessels. The product as discussed in this application may be dissolved organic and inorganic compounds and particulates.

When flow is established through the system (100, 200) the retentate back pressure control valve (16) is adjusted to a pressure sufficient to cause selected material to flow from the retentate side of the membrane (31) to the permeate side, resulting in fractionation of the feed stream by differences in the molecular weight and or particle or globule size of the components of said feed stream, and permeate is continuously discharged via the permeate outlet valve (14) to the permeate outlet (15). The retentate may be recycled to the feed tank (1) for batch concentration in the system (100) of FIG. 1 and FIG. 2, or passed through for additional processing or storage.

In the system (100) of FIG. 3 and FIG. 4, a stage circulation pump (22) is added to the system (100) to provide rapid circulation through the membrane vessel (7) or vessels by opening line block valve (5), resulting in recirculation of retentate through the infeed valve (4), the vessel retentate outlet valve (13) and the line block valve (5).

Forward flow through the system (100) is maintained due to introduction of fresh product via the pump (1) which continuously displaces a proportion of the retentate via the retentate back pressure valve (16) to the retentate outlet (22).

This embodiment of FIG. 3 and FIG. 4 provides for increased operational efficiency due to the increase in retentate velocity that can be generated by the stage recirculation pump (22) in the short loop, and permits the addition of more membrane vessels (7) than can be accommodated in the system (100) of FIG. 1 and FIG. 2.

FIG. 5 illustrates a system (200) with a plurality of stages linked to the product feed system by a common pipeline.

Operation of the system (200) is similar to that of the ones described in FIG. 1-4 with all stages being initially drained and put into production sequentially.

The concentration level of the retentate can be controlled by means of the ratio of measured flowrate through the infeed flow meter (23) to the measured flowrate through the retentate discharge flow meter (25). Adjustment of the retentate back pressure valve (16) is used to control the ratio.

At the end of the production phase, the retentate and permeate are removed from the system (100, 200) by opening the raw product and infeed valve (4), closing the line block valve (5), opening the membrane vessel retentate outlet valve (13), opening the permeate outlet valve (14), and fully opening the retentate back pressure valve (16).

The air/gas shutoff valve (19) is then opened and air or other gas passes through the air blow valve (3) forcing product remaining in the vessel feed line (6), through the retentate inlet (8) and down through the membrane vessel (7) to the retentate outlet (11) and the permeate outlet (15) to be discharged from the system.

After a predetermined interval, the permeate air control valve (9) is opened and the permeate outlet valve (14) is closed to increase the scavenging effect through the retentate side of the membrane (31) while maintaining equal pressure on both sides of the membrane (31).

When the retentate flow from the system (100, 200) is insignificant the air/gas shutoff valve (19) is closed, the permeate outlet valve (14) is opened and the permeate air control valve (9) is closed. In multi stage systems (200), each stage is discharged sequentially at the end of production.

After the end of production phase, cleaning solutions can be introduced to the system (100, 200). The system of the present application achieves water economy by using sequential bursts of rinse water followed by complete drainage. This utilizes successive dilution techniques to reduce water use and is more efficient than time based continuous flow. Cleaning normally requires both rinsing of residual product followed by one or more chemical cleaning steps which involve circulation of the chemicals through the system (100, 200) at high velocity and under controlled temperature and pressure regimes. Additional rinsing takes place between chemical circulation steps where the chemicals used are incompatible. Preferably, temperature controlled water is filled into the feed tank (1) or supplied from an external tank. The infeed valve (4) is opened, the line block valve (5) is closed, the retentate outlet valve (13) is opened, the permeate discharge valve (14) is opened, and the retentate back pressure control valve (16) is opened completely and the permeate air control valve (9) is closed.

The pump (2) and the stage recirculation pump (22), if installed, are activated for a predetermined time causing water to flow through the vessel feed line (6) to the retentate inlet (8) of the membrane vessel (7) or vessels and vertically down through the membrane vessel (7) or vessels.

At the end of the predetermined time the permeate air control valve (9) is opened and the air/gas shutoff valve (19) is opened for a predetermined time to scavenge rinse water from the system (100, 200). This rinse procedure may be repeated until both retentate, permeate and chemical residues are evacuated from the system.

Circulation cleaning replicates the production procedure with the chemicals recirculated back to the feed tank (1) or an external supply tank. Permeate air control valve (9) is opened and closed on a predetermined time cycle. At the end of circulation cleaning chemicals are discharged to external processes using the same sequence as the end of production procedure.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

The invention claimed is:

1. A crossflow membrane separation system comprising:
a membrane vessel housing a membrane element, wherein the membrane vessel has a vertical orientation;
a vessel retentate inlet that provides a retentate from a vessel feed line directly into a retentate side of the vertically oriented membrane, wherein the vessel feed line receives the retentate from a pump;
a back pressure control valve adjusted to remove permeate from the retentate to a permeate side of the vertically oriented vessel through the membrane element;
a vessel retentate outlet and a vessel permeate outlet, each removing the retentate and the permeate from the vessel, respectively; and
a permeate side air inlet configured on a top end of the vertically oriented vessel that receives air from a permeate air control valve, a retentate side air inlet that receives air from a retentate air control valve, wherein air from the permeate and retentate air inlets scavenges remaining retentate, permeate or chemical residues from the membrane element, and further wherein the permeate side air inlet and the retentate air inlet each provide air pressure to the vessel such that a pressure in the retentate side is continuously greater than or equal to a pressure on the permeate side,
wherein the retentate side air inlet receives air from the vessel feed line, and the permeate side air inlet is downstream of the retentate side air inlet, and is fluidly connected to it by the permeate air control valve.

2. The system of claim 1, wherein the membrane element is a spiral membrane.

3. The system of claim 1, wherein the retentate is recirculated to a feed tank through a recirculation line after the retentate is removed from the vessel.

4. The system of claim 1, wherein the retentate is discharged from the system after it is removed from the vessel.

5. The system of claim 4, wherein the retentate is discharged to an external system or an external process.

6. The system of claim 4, wherein the retentate is discharged to a storage unit.

7. The system of claim 1, further comprising a plurality of membrane vessels, wherein the vessel retentate inlet of each of the plurality of membrane vessels are coupled to a common vessel feed line, wherein the plurality of membrane vessels is a vessel stage.

8. The system of claim 7, further comprising a plurality of vessel stages, wherein the vessel feed line of each of the plurality of vessel stages are coupled to a common feed tank.

9. The system of claim 1, further comprising a stage circulation pump configured in the vessel feed line such that it assists in the movement of the retentate into the membrane vessel.

10. The system of claim 9, wherein the pump and the stage circulation pump are centrifugal pumps.

11. The system of claim 9, wherein the pump and the stage circulation pump are positive displacement pumps.

12. A membrane separation system for the separation of dissolved organic and inorganic compounds and particulates comprising:
- a plurality of membrane vessels, each housing a membrane element, wherein the plurality of membrane vessels have a vertical orientation, further wherein each of the plurality of vessels are a vessel stage;
- a plurality of vessel stages, wherein a vessel feed line of each of the plurality of vessel stages is connected to a common feed tank;
- a vessel retentate inlet that provides a retentate from the vessel feed line directly into a retentate side of each of the plurality of the vertically oriented membrane, wherein the vessel feed line receives the retentate from a pump coupled with the common feed tank, wherein the vessel retentate inlet of each of the plurality of vessels is connected to a common vessel feed line;
- a back pressure control valve adjusted to remove permeate from the retentate to a permeate side of the vertically oriented vessel through the membrane;
- a vessel retentate outlet and a vessel permeate outlet, each removing the retentate and the permeate from the vessel, respectively;
- a permeate side air inlet configured on a top end of the vertically oriented vessel that receives air from a permeate air control valve, a retentate side air inlet that receives air from a retentate air control valve, wherein air from the permeate and retentate air inlets scavenges remaining retentate, permeate or chemical residues from the membrane element, and further wherein the permeate side air inlet and the retentate air inlet each provide air pressure to the vessel such that a pressure in the retentate side is continuously greater than or equal to a pressure on the permeate side,
- wherein the retentate side air inlet receives air from the vessel feed line, and the permeate side air inlet is downstream of the retentate side air inlet, and is fluid connected to it by the permeate air control valve.

13. The system of claim 12, wherein the plurality of vessel membranes are spiral membranes.

14. The system of claim 12, wherein the retentate is recirculated to the common feed tank through a common recirculation line after the retentate is removed from the plurality of membrane vessels.

15. The system of claim 12, wherein the retentate is discharged from the system after it is removed from the plurality of membrane vessels.

16. The system of claim 15, wherein the retentate is discharged to an external system or an external process.

17. The system of claim 15, wherein the retentate is discharged to a storage unit.

18. The system of claim 12, further comprising a plurality of stage circulation pumps configured along the vessel feed line of each of the plurality of vessel stages such that they assist in the movement of the retentate into the plurality of membrane vessels.

19. The system of claim 18, wherein the pump and the plurality of stage circulation pumps are centrifugal pumps.

20. The system of claim 18, wherein the pump and the plurality of stage circulation pumps are positive displacement pumps.

* * * * *